United States Patent
Takahata

(10) Patent No.: US 12,240,519 B2
(45) Date of Patent: Mar. 4, 2025

(54) GRASP DETECTION DEVICE

(71) Applicant: HONDA MOTOR CO., LTD., Tokyo (JP)

(72) Inventor: Osamu Takahata, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 138 days.

(21) Appl. No.: 18/154,866

(22) Filed: Jan. 16, 2023

(65) Prior Publication Data

US 2023/0227093 A1     Jul. 20, 2023

(30) Foreign Application Priority Data

Jan. 17, 2022 (JP) .................. 2022-005150

(51) Int. Cl.
*B62D 1/04* (2006.01)
*G01V 3/08* (2006.01)

(52) U.S. Cl.
CPC ............. *B62D 1/046* (2013.01); *G01V 3/088* (2013.01)

(58) Field of Classification Search
None
See application file for complete search history.

(56) References Cited

U.S. PATENT DOCUMENTS 7,379,800 B2 * 5/2008 Breed ................. B60C 23/0425
324/207.2

FOREIGN PATENT DOCUMENTS

JP        2008087566 A       4/2008

* cited by examiner

*Primary Examiner* — Farhana A Hoque
(74) *Attorney, Agent, or Firm* — CKC & Partners Co., LLC

(57) ABSTRACT

A grasp detection device 6 includes: a capacitance measurer 68 configured to measure a capacitance of an electrode 60 provided in a steering handle 2 of a vehicle; a grasp detector 70 configured to detect grasp of the steering handle by a driver based on comparison between a capacitance measurement $Ch\_d$ by the capacitance measurer 68 and a grasp threshold $Ch\_thr$; and a threshold setter 69 configured to set the grasp threshold $Ch\_thr$ based on a torque detection value $Tr\_d$ by a torque sensor 31 and the capacitance measurement $Ch\_d$, the torque sensor 31 being configured to detect steering torque. The threshold setter 69 sets the grasp threshold $Ch\_thr$ based on the torque detection value $Tr\_d$ and the capacitance measurement $Ch\_d$ at the time when the vehicle is in a specific driving state, and the torque detection value $Tr\_d$ exceeds a torque threshold.

12 Claims, 3 Drawing Sheets

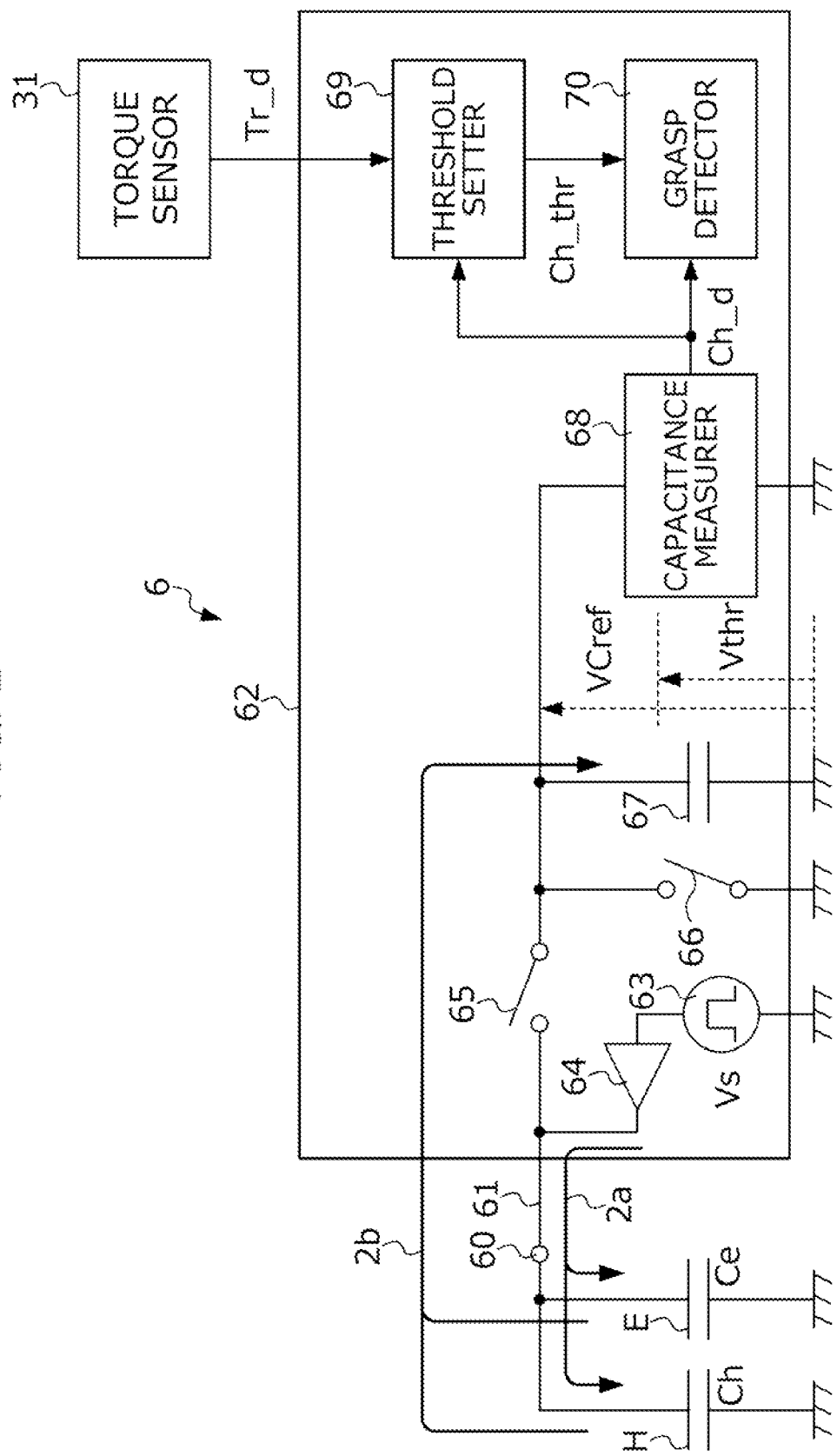

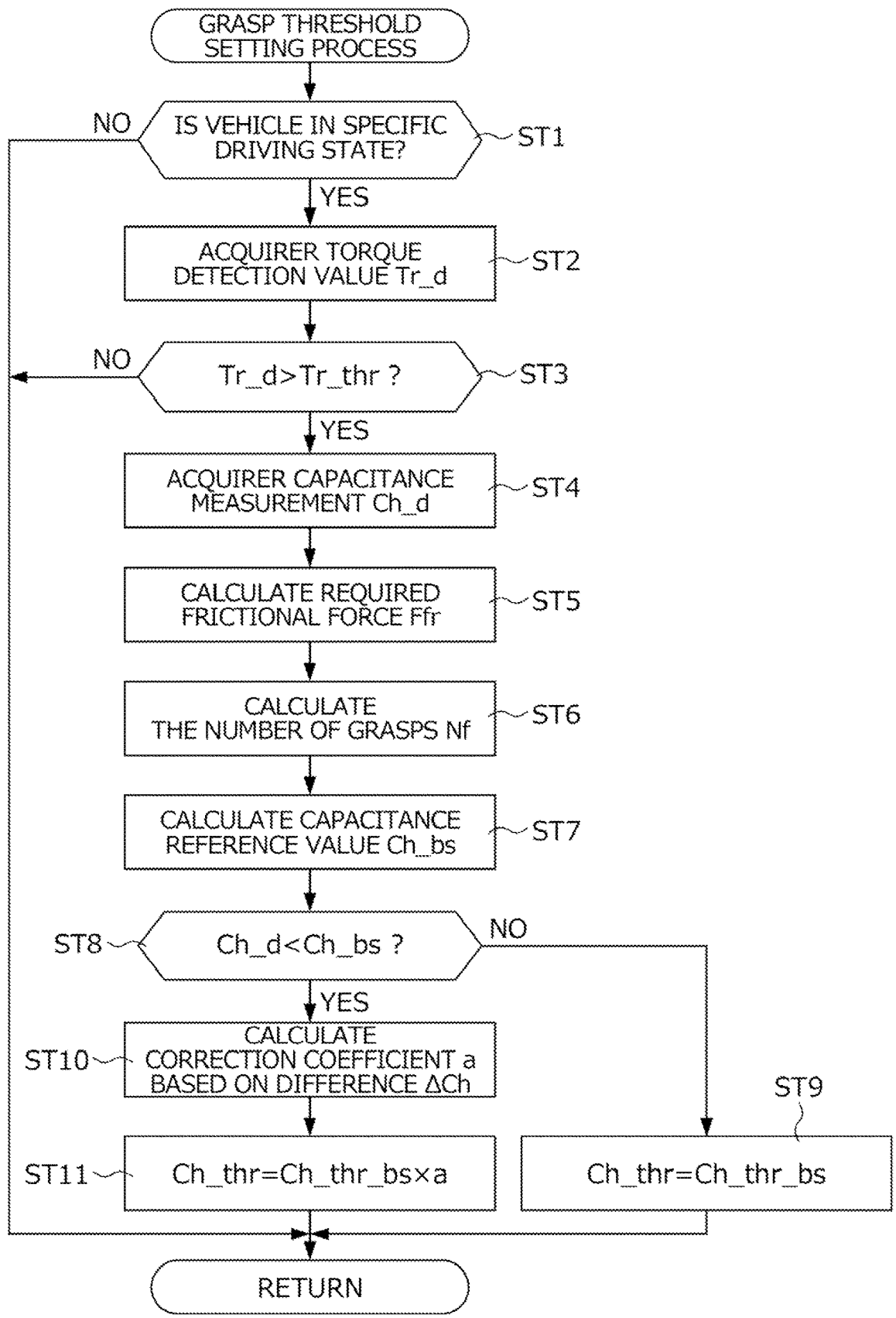

GRASP DETECTION DEVICE

This application is based on and claims the benefit of priority from Japanese Patent Application No. 2022-005150, filed on 17 Jan. 2022, the content of which is incorporated herein by reference.

BACKGROUND OF THE INVENTION

Field of the Invention

The present invention relates to a grasp detection device. More specifically, the present invention relates to a grasp detection device for detecting grasp of a steering handle by a driver.

Related Art

Recently, for the purpose of improving safety of traffic, more and more vehicles are provided with a driving support apparatus that is adapted to support a driver driving the vehicle and is equipped with a lane keeping function, a lane departure prevention function, a lane change function, a preceding vehicle following function and the like. In a vehicle provided with such a driving support apparatus, grasp of a steering handle by a driver is detected, for example, by a grasp detection device as disclosed in Japanese Unexamined Patent Application, Publication No. 2008-87566. If it is detected that the steering handle is not grasped, the driver may be prompted to grasp the steering handle, or a driving support function that is being executed may be cancelled.

In the grasp detection device disclosed in Japanese Unexamined Patent Application, Publication No. 2008-87566, a capacitance of an electrode provided in a rim part of a steering handle is measured, and grasp of the steering handle by a driver is detected based on the capacitance.

Patent Document 1: Japanese Unexamined Patent Application, Publication No. 2008-87566

SUMMARY OF THE INVENTION

A capacitance formed by a human body, including a driver's hands grasping a steering handle, differs depending on the driver's physique, physical constitution, clothes and the like. Therefore, in a capacitive grasp detection device as disclosed in Japanese Unexamined Patent Application, Publication No. 2008-87566, a threshold for a capacitance measurement is often set on the assumption of standard physique, physical constitution and clothes. Therefore, if a person who does not show a standard capacitance measurement (for example, a small person with a dry skin) is a driver, there is a possibility that grasp of a steering handle by the driver cannot be appropriately detected.

An object of the present invention is to provide a grasp detection device capable of detecting grasp of a steering handle by a driver regardless of the physique, physical constitution, clothes and the like, thereby contributing to improvement of safety of traffic.

(1) A grasp detection device according to an embodiment of the present invention includes: a measurer configured to measure an electrical characteristic of an electrode provided in a steering handle of a vehicle; a detector configured to detect grasp of the steering handle by a driver based on comparison between an electrical characteristic measurement by the measurer and a grasp threshold; and a threshold setter configured to set the grasp threshold based on a torque detection value by a torque sensor and the electrical characteristic measurement, the torque sensor being configured to detect steering torque to the steering handle.

(2) In this case, it is preferable that the threshold setter sets the grasp threshold based on the torque detection value and the electrical characteristic measurement at a time when the torque detection value exceeds a predetermined torque threshold.

(3) In this case, it is preferable that the threshold setter sets the grasp threshold based on the torque detection value and the electrical characteristic measurement at a time when the vehicle is in a specific driving state.

(4) In this case, it is preferable that the threshold setter calculates an electrical characteristic reference value based on the torque detection value and sets the grasp threshold based on comparison between the electrical characteristic measurement and the electrical characteristic reference value.

(5) In this case, it is preferable that the threshold setter sets the grasp threshold to a value smaller than a predetermined grasp reference value in a case where the electrical characteristic measurement is smaller than the electrical characteristic reference value.

(1) A grasp detection device includes: a measurer configured to measure an electrical characteristic of an electrode provided in a steering handle; a detector configured to detect grasp of the steering handle by a driver based on comparison between an electrical characteristic measurement by the measurer and a grasp threshold; and a threshold setter configured to set the grasp threshold based on a torque detection value by a torque sensor and the electrical characteristic measurement. Here, the electrical characteristic measurement at the time when the driver rotates the steering handle while grasping the steering handle differs depending on the driver's physique, physical constitution, clothes and the like (hereinafter also referred to as "the driver's electrical characteristics"), whereas the torque detection value does not correlate with the driver's electrical characteristics. Therefore, since it is possible for the threshold setter to set the grasp threshold in consideration of influence of the driver's electrical characteristics on the electrical characteristic measurement using such an electrical characteristic measurement and torque detection value as above, grasp of the steering handle can be detected regardless of the driver's electrical characteristics, and, therefore, it is possible to improve safety of traffic.

(2) The threshold setter sets the grasp threshold based on the torque detection value and the electrical characteristic measurement at the time when the torque detection value exceeds a predetermined torque threshold, that is, when the driver causes the steering handle to rotate while firmly grasping the steering handle. Thereby, since it is possible to more accurately extract the influence by the driver's electrical characteristics from the electrical characteristic measurement, it is possible to set the grasp threshold to a more appropriate value and, therefore, improve safety of traffic.

(3) For example, since the driver need not perform a steering operation almost at all when traveling at a high speed, there may be a case where the torque detection value is small even if the driver firmly grasps the steering handle. In comparison, in the present invention, the threshold setter sets the grasp threshold based on the torque detection value and an electrical characteristic measurement at the time when the vehicle is in a specific driving state. Thereby, the threshold setter can set the grasp threshold based on the electrical characteristic measurement and the torque detection value acquired at a timing when the driver certainly grasps the steering handle. Thereby, since it is possible to more accurately extract the influence by the driver's electrical characteristics from the electrical characteristic measurement, it is possible to set the grasp threshold to a more appropriate value and, therefore, improve safety of traffic.

(4) The threshold setter calculates an electrical characteristic reference value based on the torque detection value and sets the grasp threshold based on comparison between the electrical characteristic measurement and the electrical characteristic reference value. Thereby, the threshold setter can more accurately extract the influence by the driver's electrical characteristics from the electrical characteristic measurement. Therefore, it is possible to set the grasp threshold to a more appropriate value and, therefore, improve safety of traffic.

(5) The threshold setter sets the grasp threshold to a value smaller than a predetermined grasp reference value if the electrical characteristic measurement is smaller than the electrical characteristic reference value. Thereby, even in a case where such a person that the electrical characteristic measurement does not show the grasp reference value even when he grasps the steering handle is the driver, it is possible to appropriately detect grasp of the steering handle by the driver and, therefore, improve safety of traffic.

BRIEF DESCRIPTION OF THE DRAWINGS

FIG. 2 is a diagram showing a circuit configuration of the grasp detection device; and FIG. 3 is a flowchart showing a specific procedure for a grasp threshold setting process.

DETAILED DESCRIPTION OF THE INVENTION

Figure 1:
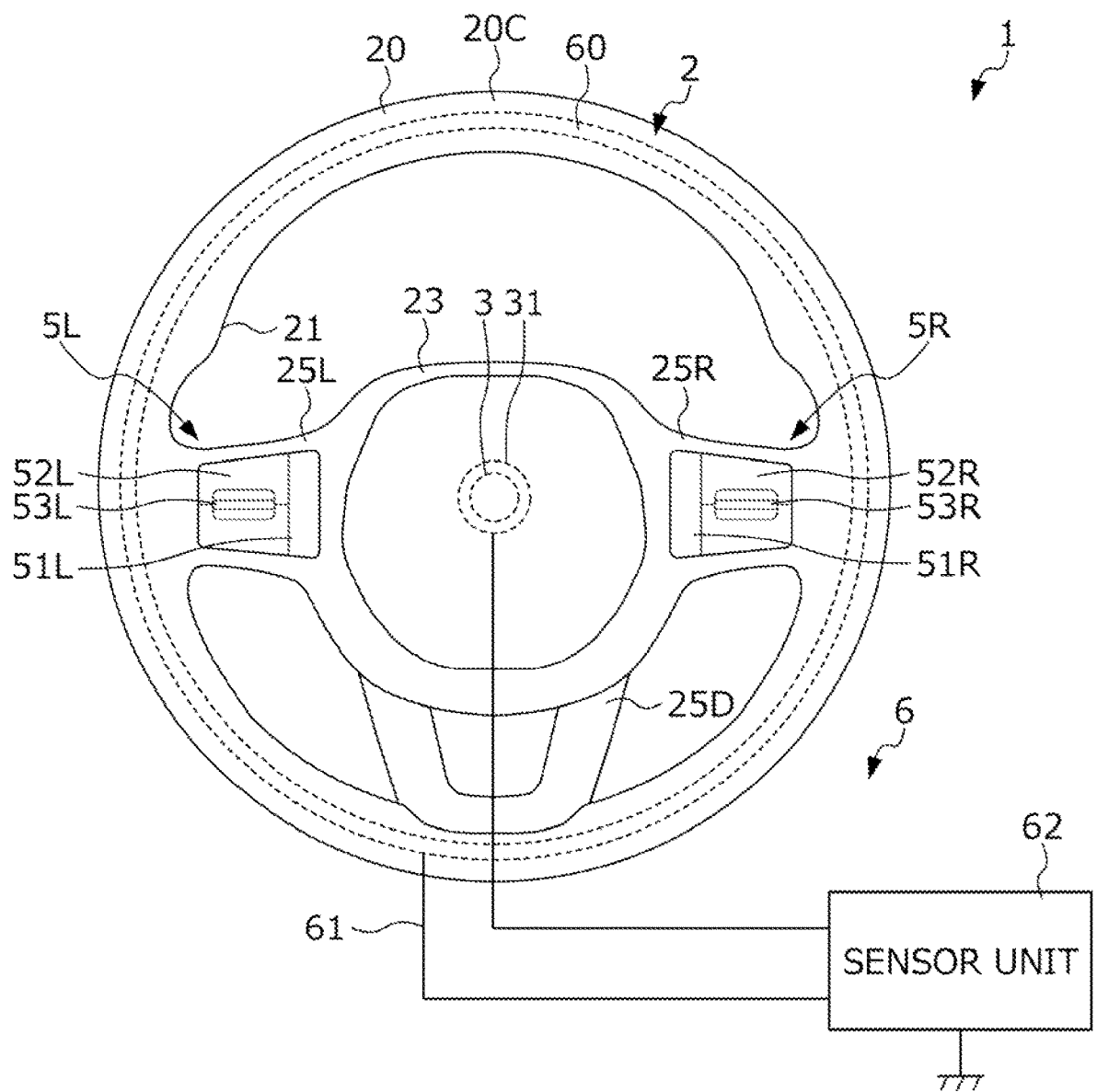
FIG. 1 is a diagram showing a configuration of a steering apparatus mounted with a grasp detection device according to an embodiment of the present invention.

A grasp detection device according to an embodiment of the present invention will be described below with reference to drawings.

FIG. 1 is a diagram showing a configuration of a steering apparatus 1 mounted with a grasp detection device 6 according to the present embodiment. The steering apparatus 1 includes a steering handle 2 that accepts a steering operation of a vehicle, an auxiliary equipment operation of vehicle auxiliary equipment and the like by a driver, a steering shaft 3 that pivotally supports the steering handle 2 and the grasp detection device 6 that detects grasp of the steering handle 2 by the driver.

The steering handle 2 includes a ring-shaped rim part 20 that can be grasped by the driver, a hub part 23 provided inside the rim part 20, three spoke parts 25L, 25R and 25D that extend along a radial direction from the hub part 23 and are connected to a rim inner circumferential part 21 of the rim part 20.

The hub part 23 is disc-shaped and provided, for example, in the center of the rim part 20 when the rim part 20 is seen from the driver, and constitutes the center of the steering handle 2. To the back side of the hub part 23 when the hub part 23 is seen from the driver, the steering shaft 3 pivotally supporting the steering handle 2 is coupled. The steering shaft 3 is an axial coupling member that couples a core bar, which is the framework of the hub part 23, with a steering mechanism constituting a part of a vehicle body, which is not shown. Therefore, steering torque generated by the driver causing the steering handle 2 to rotate is transmitted to the steering mechanism not shown by the steering shaft 3. The steering shaft 3 is provided with a torque sensor 31 that detects steering torque acting on the steering shaft 3 and outputs a signal corresponding to a detection value to the grasp detection device 6.

The rim part 20 and the hub part 23 are connected by the three spoke parts 25L, 25R and 25D. The left spoke part 25L extends along the horizontal direction and connects a left side part of the hub part 23 when the hub part 23 is seen from the driver and a left side part of the rim inner circumferential part 21 when the rim inner circumferential part 21 is seen from the driver. The right spoke part 25R extends parallel to the left spoke part 25L and along the horizontal direction, and connects a right side part of the hub part 23 when the hub part 23 is seen from the driver and a right side part of the rim inner circumferential part 21 when the rim inner circumferential part 21 is seen from the driver. The down spoke part 25D extends orthogonal to the spoke parts 25L and 25R and along the vertical direction, and connects a lower side part of the hub part 23 when the hub part 23 is seen from the driver and a lower side part of the rim inner circumferential part 21 when the rim inner circumferential part 21 is seen from the driver.

The left and right spoke parts 25L and 25R are provided with a left auxiliary equipment operation console unit 5L and a right auxiliary equipment operation console unit 5R, respectively, the left and right auxiliary equipment operation console units 5L and 5R accepting auxiliary equipment operations by the driver to operate vehicle auxiliary equipment not shown (for example, audio equipment, car navigation equipment and the like). Each of the auxiliary equipment operation console units 5L and 5R is rectangular when seen from the driver. The driver can operate the vehicle auxiliary equipment by operating a plurality of switches 51L, 52L, 53L, 51R, 52R and 53R provided on the left and right auxiliary equipment operation console units 5L and 5R with his finger.

Hereinafter, a position of each of the rim part 20, the rim inner circumferential part 21, the hub part 23 and the steering shaft 3 that are approximately circular when seen from the driver and an orientation of each of the spoke parts 25L, 25R and 25D may be expressed by a clockwise angle [°] relative to an upper end part 20C of the rim part 20 when the rim part 20 is seen from the driver, with the steering shaft 3 as the center. That is, the right spoke part 25R extends along a direction of 90° and connects the hub part 23 and a part of the rim inner circumferential part 21 at 90°. The down spoke part 25D extends along a direction of 180° and connects the hub part 23 and a part of the rim inner circumferential part 21 at 180°. The left spoke part 25L extends along a direction of 270° and connects the hub part 23 and a part of the rim inner circumferential part 21 at 270°.

The grasp detection device 6 includes an electrode 60 provided in the steering handle 2 and a sensor unit 62 that is electrically connected to the electrode 60.

The electrode 60 is, for example, ring-shaped and conductive. The electrode 60 is provided inside the rim part 20. Though description is made on the case where the electrode 60 is provided inside the rim part 20 in the present embodiment, the shape of the electrode 60 and the position where the electrode 60 is provided are not limited thereto. The electrode 60 is not limited to the ring-shaped and may be plate-shaped. The position where the electrode 60 is provided may be anywhere in the steering handle 2. In addition to the rim part 20, the spoke parts 25L, 25R and 25D, the hub part 23 and the like are also possible.

The sensor unit 62 is connected to the electrode 60 via a wire 61. The sensor unit 62 is provided, for example, inside the left spoke part 25L together with the left auxiliary equipment operation console unit 5L described above.

FIG. 2 is a diagram showing a circuit configuration of the grasp detection device 6. The sensor unit 62 measures an electrical characteristic of the electrode 60 (for example, a capacitance between the electrode 60 and the earth connection) and detects grasp of the steering handle 2 by the driver based on a result of the measurement and a torque detection value by the torque sensor 31.

The sensor unit 62 includes a pulse power source 63, an amplifier 64, a first switch 65, a second switch 66, a charging capacitor 67, a capacitance measurer 68, a threshold setter 69 and a grasp detector 70, and detects grasp of the steering handle 2 by the driver by using these. In FIG. 2, the capacitance between the electrode 60 and the earth connection (for example, the vehicle body) is shown as a capacitance Ch formed by a human body H, including the driver's hands operating the steering handle 2, and a stray capacitance Ce formed by a floating capacitor E of wires, parts and the like except the human body H.

As shown in FIG. 2, the pulse power source 63 and the amplifier 64 are connected in series. The second switch 66 and the charging capacitor 67 are connected in parallel. A series circuit configured with the pulse power source 63 and the amplifier 64 and a parallel circuit configured with the second switch 66 and the charging capacitor 67 are connected via the first switch 65. An output terminal of the amplifier 64 and the first switch 65 are connected to the electrode 60 via the wire 61. Therefore, the pulse power source 63 is connected to the electrode 60 via the amplifier 64 and the wire 61. Each of the second switch 66 and the charging capacitor 67 is connected to the electrode 60 via the first switch 65 and the wire 61.

The pulse power source 63 supplies a pulse voltage Vs with a predetermined frequency and a predetermined voltage to the amplifier 64 in response to an instruction from the capacitance measurer 68 or the grasp detector 70. The amplifier 64 amplifies the pulse voltage Vs supplied from the pulse power source 63 and applies the amplified pulse voltage to the electrode 60.

The second switch 66 is a switching element that is turned on/off by a drive circuit not shown. The drive circuit of the second switch 66 turns off the second switch 66, for example, until a voltage VCref of the charging capacitor 67 reaches a threshold Vthr determined in advance and, after the voltage VCref reaches the threshold Vthr, turns on the second switch 66 to discharge charges accumulated in the charging capacitor 67.

The first switch 65 is a switching element that is turned on/off by a drive circuit not shown. The drive circuit of the first switch 65 turns off the first switch 65 in response to rise of the pulse voltage Vs of the pulse power source 63. Thereby, the pulse voltage supplied from the pulse power source 63 and the amplifier 64 is applied to the electrode 60; charges move via a path indicated by an arrow 2a in FIG. 2; and the human body H and the floating capacitor E are charged.

The drive circuit of the first switch 65 turns on the first switch 65 in response to fall of the pulse voltage Vs of the pulse power source 63. Thereby, the human body H, the floating capacitor E and the charging capacitor 67 are connected; charges move from the human body H and the floating capacitor E to the charging capacitor 67 via a path indicated by an arrow 2b in FIG. 2; and the charging capacitor 67 is charged. Thereby, the voltage VCref of the charging capacitor 67 rises.

Therefore, when the pulse voltage is applied to the electrode 60 by the pulse power source 63 and the amplifier 64, charge and discharge of the human body H and the floating capacitor E are alternately repeated, and the voltage VCref of the charging capacitor 67 gradually increases. At this time, time (or the number of pulses of the pulse power source 63) required for the voltage VCref of the charging capacitor 67 to reach the threshold Vthr changes according to the capacitance Ch formed by the human body H, that is, the state of the driver's hands operating the steering handle 2. That is, when the driver's hands are in contact with or close to the steering handle 2, and the capacitance Ch is high, the time required for the voltage VCref of the charging capacitor 67 to reach the threshold Vthr is short; and, when the driver's hands are away from the steering handle 2, and the capacitance Ch is low, the time required for the voltage VCref of the charging capacitor 67 to reach the threshold Vthr is long.

The capacitance measurer 68 measures the time and the number of pulses required until the voltage VCref of the charging capacitor 67 reaches the threshold Vthr, and indirectly measures the capacitance Ch formed by the human body H existing near the electrode 60 based on a result of the measurement. The capacitance measurer 68 transmits a measurement Ch_d of the capacitance Ch obtained by the above procedure to the threshold setter 69 and the grasp detector 70.

The grasp detector 70 detects grasp of the steering handle 2 by the driver based on comparison between the capacitance measurement Ch_d by the capacitance measurer 68 and a grasp threshold Ch_thr set by the threshold setter 69 by a procedure described later. More specifically, the grasp detector 70 determines that the driver is not grasping the steering handle 2 if the capacitance measurement Ch_d is below the grasp threshold Ch_thr, and determines that the driver is grasping the steering handle 2 if the capacitance measurement Ch_d is equal to or above the grasp threshold Ch_thr.

The threshold setter 69 sets the grasp threshold Ch_thr referred to by the grasp detector 70, by executing a grasp threshold setting process described below, based on a torque detection value Tr_d by the torque sensor 31 and the capacitance measurement Ch_d by the capacitance measurer 68.

FIG. 3 is a flowchart showing a specific procedure for the grasp threshold setting process. The grasp threshold setting process is repeatedly executed by the threshold setter 69 in a predetermined cycle after the vehicle is started.

At the beginning, at step ST1, the threshold setter 69 determines whether the current driving state of the vehicle is a predetermined specific driving state or not. Here, the specific driving state refers to a driving state in which steering torque can rise only by a steering operation of the steering handle 2 by the driver and is, for example, a driving state immediately after beginning starting of the vehicle. In the case of immediately after beginning starting of the vehicle, since the driver has to grasp the steering handle 2 to get the vehicle out of a parking area and cause the steering handle 2 to rotate, the steering torque can rise only by a steering operation of the steering handle 2 by the driver. If a result of determination at step ST1 is NO, the threshold setter 69 ends the grasp threshold setting process. In the case of YES, the threshold setter 69 proceeds to step ST2.

Next, at step ST2, the threshold setter 69 acquires a torque detection value Tr_d from the torque sensor 31 and proceeds to step ST3. Next, at step ST3, the threshold setter 69 determines whether the acquired torque detection value Tr_d is larger than a predetermined torque threshold Tr_thr or not. If a result of determination at step ST3 is NO, the threshold setter 69 ends the grasp threshold setting process. In the case of YES, the threshold setter 69 proceeds to step ST4.

Next, at step ST4, the threshold setter 69 acquires a capacitance measurement Ch_d from the capacitance measurer 68 and proceeds to step ST5. The threshold setter 69 sets a grasp threshold Ch_thr based on the torque detection value Tr_d and the capacitance measurement Ch_d at the time when the vehicle is in the specific driving state, and the torque detection value Tr_d exceeds the torque threshold Tr_thr.

Next, at step ST5, the threshold setter 69 calculates a required frictional force Ffr based on the torque detection value Tr_d acquired at step ST2 and proceeds to step ST6. The required frictional force Ffr corresponds to a frictional force between the driver's hands and the rim part 20 required to cause the steering torque to rise to the torque detection value Tr_d only by a steering operation by the driver. The threshold setter 69 calculates the required frictional force Ffr, for example, by searching a map not shown based on the torque detection value Tr_d.

Next, at step ST6, the threshold setter 69 calculates the number of grasps Nf corresponding to the number of the driver's fingers grasping the rim part 20 based on the required frictional force Ffr calculated at step ST5 and proceeds to step ST7. Since the frictional force acting between the driver's hands and the rim part 20 increases as the number of fingers grasping the rim part 20 increases, the number of grasps Nf increases as the required frictional force Ffr increases. The threshold setter 69 calculates the number of grasps Nf, for example, by searching a map not shown based on the required frictional force Ffr.

Next, at step ST7, the threshold setter 69 calculates a capacitance reference value Ch_bs based on the number of grasps Nf calculated at step ST6 and proceeds to step ST8. The capacitance reference value Ch_bs corresponds to a capacitance measured by the capacitance measurer 68 when a virtual driver whose physique, physical constitution, clothes and the like are standard (hereinafter also referred to as a "standard driver") grasps the rim part 20 with the number of grasps Nf. The threshold setter 69 calculates the capacitance reference value Ch_bs, for example, by searching a map not shown based on the number of grasps Nf.

Next, at step ST8, the threshold setter 69 determines whether the capacitance measurement Ch_d acquired at step ST4 is smaller than the capacitance reference value Ch_bs calculated at step ST7 or not.

If a result of determination at step ST8 is NO, the threshold setter 69 proceeds to step ST9, sets a grasp reference value Ch_thr_bs determined in advance as the grasp threshold Ch_thr, transmits it to the grasp detector 70 and ends the grasp threshold setting process. The grasp reference value Ch_thr_bs corresponds to a grasp threshold specified on the assumption of a standard driver. More specifically, the grasp reference value Ch_thr_bs is set to a value that is slightly smaller than a capacitance measured by the capacitance measurer 68 when the standard driver grasps the rim part 20.

If a result of the determination at step ST8 is YES, that is, the capacitance measurement Ch_d is smaller than the capacitance reference value Ch_bs, the threshold setter 69 proceeds to step ST10. At step ST10, the threshold setter 69 calculates a correction coefficient a between 0 and 1 based on a difference ΔCh (=Ch_bs−Ch_d) between the capacitance reference value Ch_bs and the capacitance measurement Ch_d and proceeds to step ST11. More specifically, the threshold setter 69 calculates the correction coefficient a so that the correction coefficient comes close to 1 as the difference ΔCh comes close to 0, and comes close to 0 as the difference ΔCh increases.

Next, at step ST11, the threshold setter 69 sets the grasp threshold Ch_thr by correcting the grasp reference value Ch_thr_bs using the correction coefficient a set between 0 and 1, transmits the grasp threshold Ch_thr to the grasp detector 70 and then ends the grasp threshold setting process. More specifically, if the capacitance measurement Ch_d is smaller than the capacitance reference value Ch_bs, the threshold setter 69 sets the grasp threshold Ch_thr to a value smaller than the grasp reference value Ch_thr_bs by multiplying the grasp reference value Ch_thr_bs by the correction coefficient a set between 0 and 1 (Ch_thr=Ch_thr_bs×a). Thus, if the capacitance measurement Ch_d is smaller than the capacitance reference value Ch_bs, the threshold setter 69 sets the grasp threshold Ch_thr to a value smaller than the grasp reference value Ch_thr_bs, and sets the grasp threshold Ch_thr to a smaller value as the difference ΔCh increases.

According to the grasp detection device 6 of the present embodiment, the following effects are obtained.

(1) The grasp detection device 6 includes: a capacitance measurer 68 that measures a capacitance of an electrode 60 provided in a steering handle 2; a grasp detector 70 that detects grasp of the steering handle 2 by a driver based on comparison between a capacitance measurement Ch_d by the capacitance measurer 68 and a grasp threshold Ch_thr; and a threshold setter 69 that sets the grasp threshold Ch_thr based on a torque detection value Tr_d by a torque sensor 31 and the capacitance measurement Ch_d. Here, the capacitance measurement Ch_d at the time when the driver rotates the steering handle 2 while grasping the steering handle 2 differs depending on the driver's electrical characteristics such as the physique, physical constitution and clothes, whereas the torque detection value Tr_d does not correlate with the driver's electrical characteristics. Therefore, since it is possible for the threshold setter 69 to set the grasp threshold Ch_thr in consideration of influence of the driver's electrical characteristics on the capacitance measurement Ch_d using such capacitance measurement Ch_d and torque detection value Tr_d, grasp of the steering handle 2 can be detected regardless of the driver's electrical characteristics, and, therefore, it is possible to improve safety of traffic.

(2) The threshold setter 69 sets the grasp threshold Ch_thr based on the torque detection value Tr_d and the capacitance measurement Ch_d at the time when the torque detection value Tr_d exceeds the torque threshold Tr_thr, that is, when the driver causes the steering handle 2 to rotate while firmly grasping the steering handle 2. Thereby, since it is possible to more accurately extract the influence by the driver's electrical characteristics from the capacitance measurement Ch_d, it is possible to set the grasp threshold Ch_thr to a more appropriate value, and, therefore, improve safety of traffic.

(3) For example, since the driver need not perform a steering operation almost at all when traveling at a high speed, there may be a case where the torque detection value Tr_d is small even if the driver firmly grasps the steering handle 2. In comparison, in the grasp detection device 6, the threshold setter 69 sets the grasp threshold Ch_thr based on the torque detection value Tr_d and the capacitance measurement Ch_d at the time when the vehicle is in a specific driving state. Thereby, the threshold setter 69 can set the grasp threshold Ch_thr based on the capacitance measurement Ch_d and the torque detection value Tr_d that are acquired at a timing when the driver certainly grasps the steering handle. Thereby, since it is possible to more accurately extract the influence by the driver's electrical characteristics from the capacitance measurement Ch_d, it is possible to set the grasp threshold Ch_thr to a more appropriate value, and, therefore, improve safety of traffic.

(4) The threshold setter 69 calculates a capacitance reference value Ch_bs based on the torque detection value Tr_d and sets the grasp threshold Ch_thr based on comparison between the capacitance measurement Ch_d and the capacitance reference value Ch_bs. Thereby, the threshold setter 69 can more accurately extract the influence by the driver's electrical characteristics from the capacitance measured value Ch_d. Therefore, it is possible to set the grasp threshold Ch_thr to a more appropriate value and, therefore, improve safety of traffic.

(5) The threshold setter 69 sets the grasp threshold Ch_thr to a value smaller than a predetermined grasp reference value Ch_thr_bs in a case where the capacitance measurement Ch_d is smaller than the capacitance reference value Ch_bs. Thereby, even in a case where such a person that the capacitance measurement Ch_d does not show the grasp reference value Ch_thr_bs even when he grasps the steering handle 2 is the driver, it is possible to appropriately detect grasp of the steering handle 2 by the driver and, therefore, improve safety of traffic.

An embodiment of the present invention has been described above. The present invention, however, is not limited thereto. Detailed components may be appropriately changed within the scope of the spirit of the present invention.

What is claimed is:

1. A grasp detection device comprising:
    a measurer configured to measure an electrical characteristic of an electrode provided in a steering handle of a vehicle;
    a detector configured to detect grasp of a rim part of the steering handle by a driver based on comparison between an electrical characteristic measurement by the measurer and a grasp threshold; and
    a threshold setter configured to set the grasp threshold based on a torque detection value by a torque sensor and the electrical characteristic measurement, the torque sensor being configured to detect steering torque to the steering handle.

2. The grasp detection device according to claim 1, wherein
    the threshold setter sets the grasp threshold based on the torque detection value and the electrical characteristic measurement at a time when the torque detection value exceeds a predetermined torque threshold.

3. The grasp detection device according to claim 1, wherein
    the threshold setter sets the grasp threshold based on the torque detection value and the electrical characteristic measurement at a time when the vehicle is in a specific driving state.

4. The grasp detection device according to claim 1, wherein
    the threshold setter calculates an electrical characteristic reference value based on the torque detection value and sets the grasp threshold based on comparison between the electrical characteristic measurement and the electrical characteristic reference value.

5. The grasp detection device according to claim 4, wherein
    the threshold setter sets the grasp threshold to a value smaller than a predetermined grasp reference value in a case where the electrical characteristic measurement is smaller than the electrical characteristic reference value.

6. The grasp detection device according to claim 2, wherein
    the threshold setter calculates an electrical characteristic reference value based on the torque detection value and sets the grasp threshold based on comparison between the electrical characteristic measurement and the electrical characteristic reference value.

7. The grasp detection device according to claim 6, wherein
    the threshold setter sets the grasp threshold to a value smaller than a predetermined grasp reference value in a case where the electrical characteristic measurement is smaller than the electrical characteristic reference value.

8. The grasp detection device according to claim 3, wherein
    the threshold setter calculates an electrical characteristic reference value based on the torque detection value and sets the grasp threshold based on comparison between the electrical characteristic measurement and the electrical characteristic reference value.

9. The grasp detection device according to claim 8, wherein
    the threshold setter sets the grasp threshold to a value smaller than a predetermined grasp reference value in a case where the electrical characteristic measurement is smaller than the electrical characteristic reference value.

10. The grasp detection device according to claim 2, wherein
    the threshold setter sets the grasp threshold based on the torque detection value and the electrical characteristic measurement at a time when the vehicle is in a specific driving state.

11. The grasp detection device according to claim 10, wherein
    the threshold setter calculates an electrical characteristic reference value based on the torque detection value and sets the grasp threshold based on comparison between the electrical characteristic measurement and the electrical characteristic reference value.

12. The grasp detection device according to claim 11, wherein
    the threshold setter sets the grasp threshold to a value smaller than a predetermined grasp reference value in a case where the electrical characteristic measurement is smaller than the electrical characteristic reference value.

* * * * *